United States Patent [19]

Mitsuka

[11] Patent Number: 4,591,880
[45] Date of Patent: May 27, 1986

[54] METHOD OF CORRECTING DISTORTION OF AN IMAGE REPRODUCED BY AN IMAGE REPRODUCING SYSTEM

[75] Inventor: Ikuo Mitsuka, Shiga, Japan

[73] Assignee: Dainippon Screen Mfg. Co., Ltd., Kyoto, Japan

[21] Appl. No.: 501,872

[22] Filed: Jun. 7, 1983

[30] Foreign Application Priority Data

Oct. 2, 1982 [JP] Japan .................... 57-173720

[51] Int. Cl.⁴ .................... G01D 9/42; H04N 1/30
[52] U.S. Cl. .................... 346/108; 346/76 L; 358/296; 358/302
[58] Field of Search ............ 358/260, 75, 288, 296, 358/302; 346/76 L, 108

[56] References Cited

U.S. PATENT DOCUMENTS

| | | | |
|---|---|---|---|
| 4,253,102 | 2/1981 | Kataoka et al. | 346/108 |
| 4,413,285 | 11/1983 | Anzai et al. | 358/260 |
| 4,445,126 | 4/1984 | Tsukada | 346/108 |
| 4,468,706 | 8/1984 | Cahill | 358/300 |

FOREIGN PATENT DOCUMENTS 1462700  1/1977  United Kingdom ........ 358/289

Primary Examiner—E. A. Goldberg
Assistant Examiner—Gerald E. Preston
Attorney, Agent, or Firm—Lowe Price LeBlanc Becker & Shur

[57] ABSTRACT

Image distortion is corrected by advancing the recording start position for a scan line as scanning progresses when an image is reproduced with an image reproducing system.

17 Claims, 8 Drawing Figures

METHOD OF CORRECTING DISTORTION OF AN IMAGE REPRODUCED BY AN IMAGE REPRODUCING SYSTEM

FIELD OF THE INVENTION

This invention relates to a method of correcting distortion of images reproduced by image reproducing systems such as drum scanners and laser beam scanners (hereinafter called "the scanner"), and especially to such a method in which correction is performed on distorted images when the scanner is used for graphic output of images having coordinate values determined on an orthogonal coordinate system.

BACKGROUND OF THE INVENTION

When graphics are processed with an automatic drafting machine or a digital-font computerized phototypesetting machine, resultant graphics data are usually stored in a memory with reference to an orthogonal coordinate system. On the other hand, when a reproduced image is recorded, using a drum scanner or other type scanner, onto a sensitive film positioned on a recording drum, subscanning is performed continuously at a feed pitch equivalent to the width of the recording beam each revolution of the recording drum. This brings about distortion in the size of the subscanning pitch in the reproduced image on the film when the graphic data, stored in the memory in orthogonal coordinates, are fed to the scanner for image reproduction. In other words, the orthogonality of coordinates resulting from scanning with a recording beam width of $\Delta x_1$ is distorted as shown in FIG. 1(b), wherein $\Delta x_1$ is on the X-axis (subscanning direction) of the correct orthogonal coordinate system and wherein the Y axis, perpendicular to the X axis, represents the direction of rotation of the recording drum as shown in FIG. 1(a). When a recording beam having a width $\Delta x_2$ larger than $\Delta x_1$ is used, the reproduced image recorded on the same coordinate system exhibits greater distortion ($\theta_2 > \theta_1$), as shown in FIG. 1(c). If the required accuracy of the reproduced image is not extreme, such distortion may be ignored and the conventional scanner can be used. However, when a recording head having several recording beams is used, or, to put it another way, when one scanning pitch (equal to the sum of the widths of the aforesaid several beams) is used, distortion of the reproduced image output may become a problem. Moreover, very high accuracy of recording dimensions is required in Raster-scanning automatic drawing machines. Wherever highly accurate image reproduction is required, the aforesaid distortion poses a major problem.

SUMMARY OF THE INVENTION

It is thus an object of the present invention to reduce image reproduction distortion in a drum and scanner image reproducing system of the above type.

It is a more specific object of the invention to reduce such distortion by advancing the recording start position for successive scan lines as scanning progresses.

To take a rotating-drum scanner as a specific example, the correction of distortion is achieved by advancing the recording start position in the main scanning direction by a predetermined amount for every prescribed number of scanning lines, in response to the angle of deviation between the main scanning direction and the direction of rotation of the recording drum.

The above and other objects and features of this invention can be appreciated more fully from the following detailed description when read with reference to the accompanying drawings.

DETAILED DESCRIPTION OF A PREFERRED EMBODIMENT OF THE INVENTION

Figure 1A:
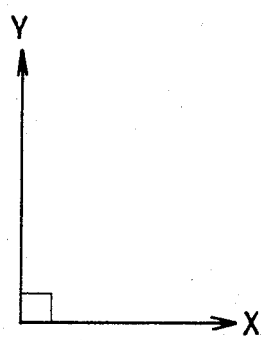
FIGS. 1(a)–1(c) show how an image is recorded with a scanner of a type to which the invention is directed.
Figure 1B:
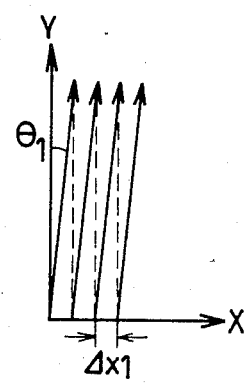
Figure 1C:
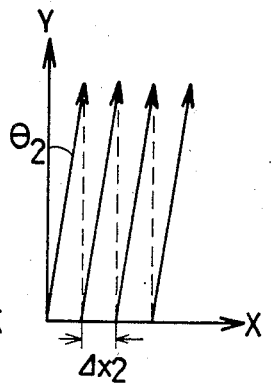
Figure 2:
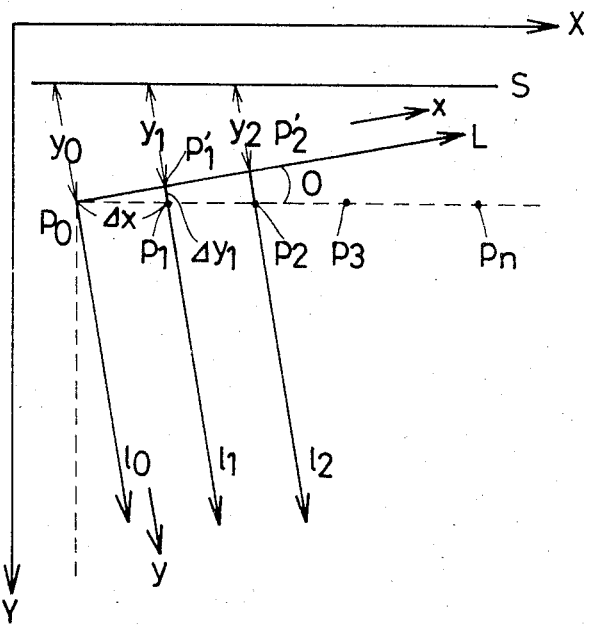
FIG. 2 shows the principle of this invention.

In FIG. 2, the main scanning direction y of the scanner output head deviates from the direction of rotation Y of a recording drum by an angle of $\theta$. $P_0$ is the recording start position on the first scanning line $l_0$, and $P_1$, $P_2$, ..., $P_n$ represent the recording start positions of scanning lines $l_1$, $l_2$, ..., $l_n$, respectively, when the correction method in this invention is not used. The subscanning feed pitch, or the width of the recording beam (total width when several beams are used) is $\Delta x$. For example, $\Delta x$ is 25 $\mu$m when the number of scanning lines is 400/cm, and is 250 $\mu$m when the number of lines is 40/cm.

First, if the reproduced image is to be expressed in an orthogonal coordinate system, the main scanning direction y and the subscanning direction x must be at right angles to each other. For example, after correction in accordance with the invention the recording start position of the scanning line passing point $P_1$ is $P_1'$, where line L (perpendicular to first scanning line $l_0$ and passing through reproduction stating position $P_0$) and the extension of scanning line $l_1$ (passing point $P_1$) intersect. The distance in need of correction $\Delta y_1$ equals the distance between points $P_1$ and $P_1'$. Therefore, for the scanning line passing point $P_1$, the intended image on the orthogonal coordinate system can be obtained by beginning recording from the start point $P_1'$, at the distance $\Delta y_1$ from the point $P_1$, toward the direction opposite to the direction of rotation, or by scanning earlier by a time $\Delta y_1/v$, where v is the main scanning velocity. Clearly, the general correction quantity $\Delta y_n$ at point $P_n$ is $n\Delta y_1$.

There are several ways of determining actual scanning start positions $P_1$, $P_2$ ... For example, let it be assumed that a point exists on the extension of the first scanning line $l_0$ in a direction opposite the direction of rotation at distance $y_0$ from point $P_0$. A reference line S is drawn through said point and parallel to the axis of the recording drum. Now, the distances ($y_1$, $y_2$, ..., $y_n$) between this reference line S and the recording start positions of the scanning lines are corrected in such a way that recording of the reproduced image is initiated when the recording drum has started rotation. The said distances ($y_1$, $y_2$, ..., $y_n$) can be given as:

$$y_n = y_0 - \Delta y_n = y_0 - n \cdot \Delta y_1 \quad (1)$$
(where $n = 0, 1, 2, \ldots$)

Figure 3:
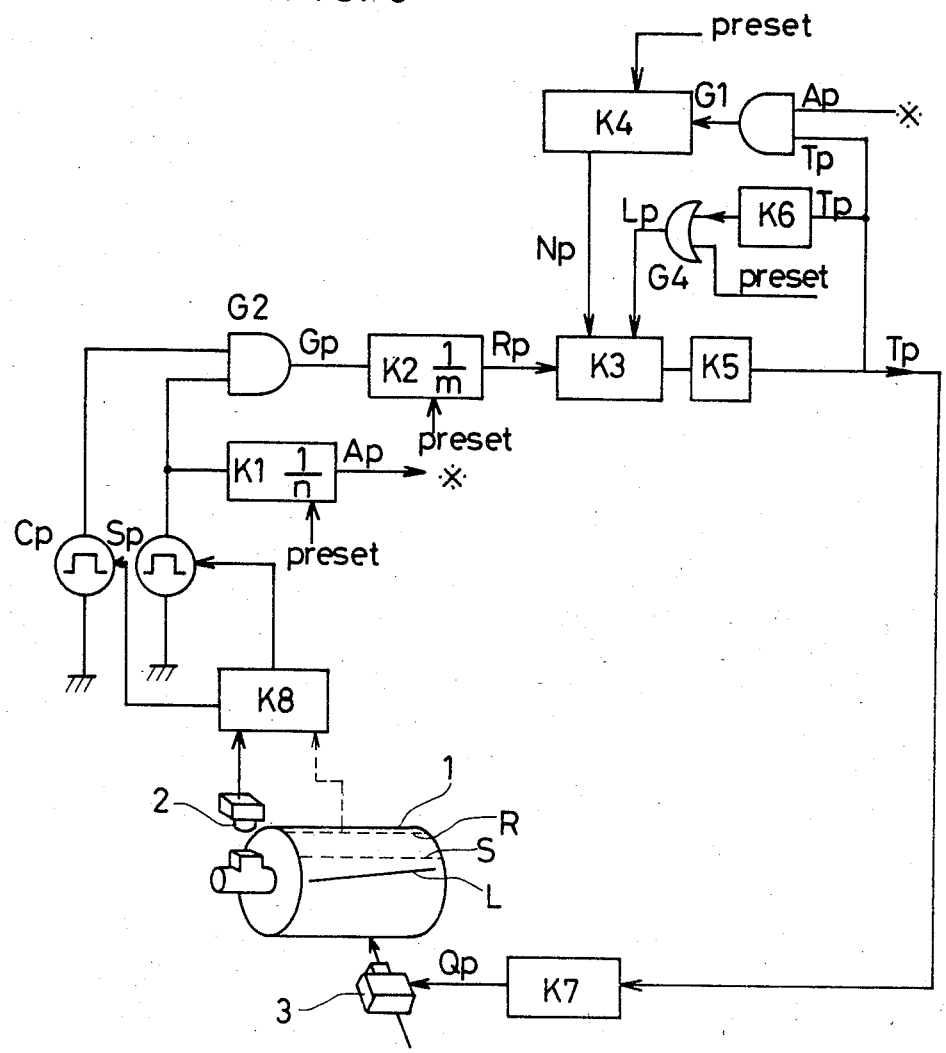
FIG. 3 shows a preferred embodiment of this invention.
Figure 4:
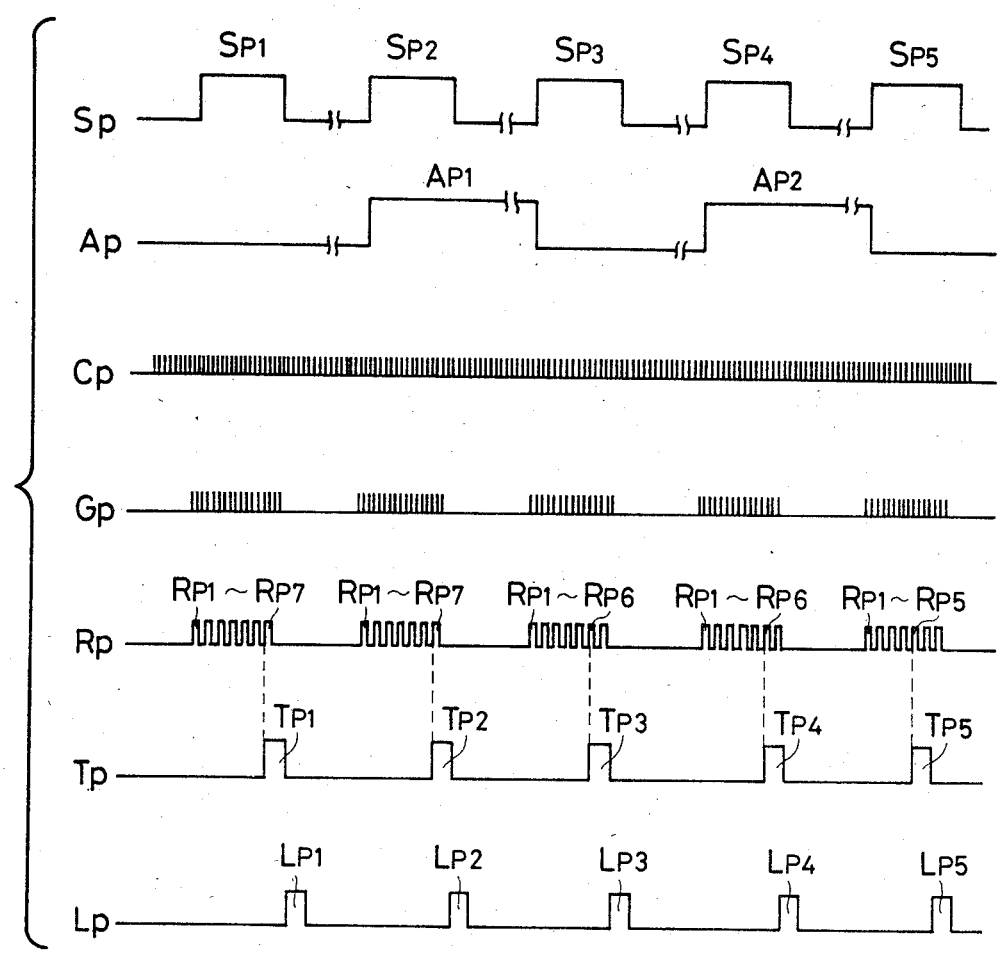
FIG. 4 is a timing chart describing output signals at different locations of the circuit illustrated in FIG. 3.

FIG. 3 shows a circuit in which the method of this invention is used. FIG. 4 is the timing chart which describes the operation of this circuit. In FIG. 3, long start pulses $S_P$ are generated synchronously with a prescribed position of the recording drum 1 during rotation of the drum, for example, at a position on the reference line S. These pulses are generated by a timing pulse generating circuit $K_8$ each time the rotary encoder 2 provides one rotation pulse or when a mark R provided at the start position of drum rotation is detected. Clock pulses $C_P$ are generated by the timing pulse generating circuit $K_8$ using N pulses output from the rotary encoder N times per drum rotation. In order to increase correction accuracy, a pulse is employed which has a higher frequency (e.g. by a ratio of 25 times) than the recording clock pulse. The interval between clock pulses $C_P$ is made to correspond to a scan length of 1 μm, for example, so tht it can be used for calculating correction quantity (length). The start pulses $S_P$ are provided to a first counter $K_1$. For every n start pulses $S_P$ provided to the counter $K_1$, that is, for every n rotations of the recording drum 1, the counter $K_1$ outputs one renewal command pulse $A_p$ to a preset counter $K_4$ (described later) to preset the number of rotation n.

For example, when n=2 is preset, oner renewal command pulse $A_p$ is output from the counter $K_1$ for each two rotations of the recording drum, as shown on the timing chart in FIG. 4. Meanwhile, the start pulses $S_p$ and the clock pulses $C_p$ are input to a second counter $K_2$ via an AND gate $G_2$. Every time m clock pulses $C_p$ are input to the second counter $K_2$, this counter outputs one correction pulse $R_p$ which is equivalent to the length ($\Delta y_1$) to be corrected by one correction operation. For example, when m=3 is preset, one correction pulse is output from the second counter $K_2$ every time three clock pulses $C_p$ are counted. Thus, the first correction quantity becomes 3 μm.

AND gate $G_2$ outputs pules $G_p$, representing occurrence of clock pulses $C_p$ during the high level of the start pulses output. $K_3$ is a coincidence circuit, comprising a counter and other devices, which compares correction data $N_p$ shifted from preset counter $K_4$ (described later) with the number of correction pulses $R_p$ output from the second counter $K_2$. When these two numbers coincide, said coincidence circuit $K_3$ sends the coincidence signal, as recording start pulses $T_p$, to an output head control circuit $K_7$ via a monostable multi-vibrator $K_5$ in order to control the recording start position of an output head 3.

$K_4$ is a preset counter in which the number of clock pulses corresponding to the maximum correction length represented by $y_0$ in equation (1) is at first set. In the presently preferred embodiment of this invention, the number is $N_p=7$. The number $N_p=7$ is also set in the coincidence circuit $K_3$ at initialization.

Each time a renewal command pulse $A_p$ from the first counter $K_1$ and a recording start pulse $T_p$ from the multi-vibrator $K_5$ are provided to the preset counter $K_4$ via the AND gate $G_1$ whose output is connected to the countdown input of $K_4$, the preset counter $K_4$ counts down the preset number ($N_p$) by one. The reduced count is stored in the coincidence circuit $K_3$ in response to load pulses $L_p$ from a delay circuit $K_6$ (which will be described later).

Therefore, in this embodiment, when the first start pulse $S_{p1}$ is detected, correction pulses ($R_{p1} \ldots R_{p7}$) are output in order from the second counter $K_2$ while said pulse is at a high level, and when the pulse $R_{p7}$ produced in this manner is input to the correction circuit $K_3$, the coincidence signals are converted to start pulses $T_p$ via the multi-vibrator $K_5$ to be input to a counter $K_7$ (mentioned later) forming part of a control circuit which controls the output head 3.

Meanwhile, the recording start pulses $T_p$ are also input to the delay circuit $K_6$ and to the AND gate $G_1$. However, since renewal command pulses $A_p$ from the first counter $K_1$ are not input at that time to the other input terminal of the AND gate $G_1$, the correction data $N_p$ of the preset counter $K_4$ cannot be counted down and remains at $N_p=7$. In the coincidence circuit $K_3$, the number $N_p=7$ is again set by load pulse $L_p$. When the second start pulse $S_{p2}$ is detected, the second recording start pulse $T_{p2}$ is output when the seventh correction pulse $R_{p7}$ is input to the coincidence circuit $K_3$ in the same way as described above for the first start pulse $S_{p1}$. The recording start pulse $T_{p7}$ controls output head 3 and is input to the delay circuit $K_6$ and to the AND gate $G_1$. Since the renewal command pulse $A_{p1}$ from the first counter $K_1$ has been input to the other input terminal of the AND gate $G_1$, the correction data of the preset counter $K_4$ is counted down to $N_p=6$. This correction data $N_p(=6)$ is then input to the coincidence circuit $K_3$ by the load pulse $L_p$.

When the third start pulse $S_{p3}$ is detected, the recording start pulse $T_{p3}$ is output when the sixth correction pulse $R_{p6}$ from the second counter $K_2$ is input to the coincidence circuit $K_3$. Thus, the recording start position of the output head 3 can be controlled by timing it three pulses (3 μm) earlier than when the first or second start pulse is detected.

Figure 5:
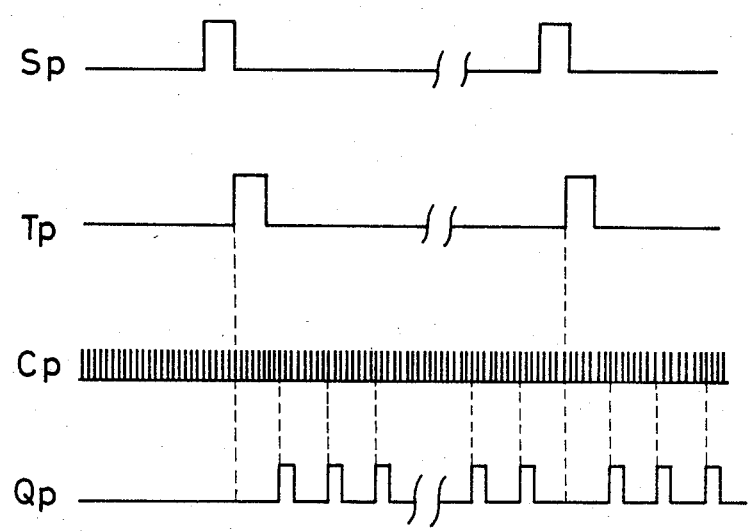
FIG. 5 is a timing chart describing I/O signals at different locations of the circuit illustrated in FIG. 6.

The fourth and subsequent start pulses $S_{p4}$, $S_{p5}$ are processed in the same way. Each time two start pulses $S_{p4}$, $S_{p5}$ are detected, the recording start position of the output head 3 is corrected. Once the recording start position is determined clock pulses $Q_p$ for recording are generated in the counter $K_7$ (mentioned later) by counting the clock pulses $C_p$, thereby determining the position of each picture element to be reproduced. FIG. 5 shows the timing chart of the start pulses $S_p$, the recording start pulses $T_p$, the clock pulses $C_p$ and the clock pulses for recording $Q_p$. In the aforesaid embodiment, it was stated that the frequency of clock pulses $C_p$ is twenty-five times that of the clock pulse for recording $Q_p$. However, the ratio is seen to be 8/1 in FIG. 5.

Figure 6:
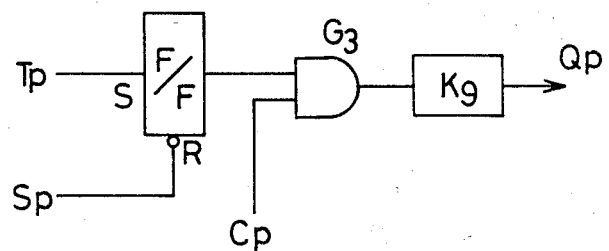
FIG. 6 shows an embodiment of this invention intended for generating clock pulses for recording.

The recording pulses $Q_p$ can be generated by the circuit illustrated for example in FIG. 6. When the recording start pulse $T_p$ is input to a flip-flop circuit (F/F) in which the start pulses $S_p$ are provided to the reset terminal and the recording start pulses $T_p$ to the set terminal, said flip-flop circuit (F/F) outputs a high level signal until the input of the next start pulse $S_{p2}$. In the meantime, the clock pulses $C_p$ are input via AND gate $G_3$ to said counter $K_7$ in which the preset value (=8) is set. The counter $K_7$ outputs the clock pulses for recording, $Q_p$, each time eight clock pulses $C_p$ are counted.

In the above-described embodiment, the recording start position of each scanning line is corrected in the main scanning direction each two recording drum rotations. The specific number of rotations is merely illustrative, however, and the actual number to be used, as set by n in counter $K_1$, depends on actual accuracy requirements. That is, when high accuracy is required, the correction should be performed every rotation. When high accuracy is not required, however, the correction could be performed every n rotations, the number n being arbitrary. The amount of the incremental rotation, chosen in the preceding example in equal 3 μm, is determined by the number m in counter $K_2$. Counter $K_4$ indexes the starting position by an additional increment each time its contents are reduced by 1. Thus, counter $K_4$ effectively stores the index "n" used in equation (1).

The abovesaid embodiment employed a drum scanner. However, it is clear that the method in this invention can be readily applied to a laser beam scanner as well.

As mentioned above, this invention was made to record images reproduced by correcting the recording start position each prescribed number of scanning lines, when recording a reproduced image by continuously feeding in the direction of auxiliary scanning and by exposing in the main scanning direction, as in the case of image reproducing systems such as scanners. A reproduced image thus recorded is output with practically no distortion in the orthogonality of an orthogonal coordinate system, and the invention is seen to be very well suited to high accuracy image recording. Recently, there has been developed for commercial applications an image reproducing system using as recording beams the so-called "multibeam", or juxtaposed thin beams. The method in the present invention is especially effective in high accuracy image processing using such an image reproducing system.

I claim:

1. In a method of correcting distortion of images reproduced by an image reproducing system, which image is recorded in a sequence of consecutive scan lines by a recording beam controlled by an image signal on photo-sensitive material fed continuously in a subscanning direction at a prescribed feeding pitch relative to the recording beam, the improvement comprising the steps of determining a correction quantity for a recording start position for successive scan lines in accordance with the subscanning feeding pitch and advancing a recording start position for said successive scan lines by said correction quantity determined in accordance with the subscanning feeding pitch.

2. A method of correcting distortion of images reproduced by an image reproducing system according to claim 1, wherein said step of determining a correction quantity comprises the step of determining a distance between two intersections, one of which intersections is that of each scanning line and a reference line drawn parallel to the subscanning direction, and the other of which is the intersection of said scanning line and a line perpendicular to said scanning line which passes through a recording start position of a predetermined scanning line.

3. A method according to claim 1 comprising the further step of separating said successive scan lines having advancing recording start positions by a predetermined number of consecutive scan lines having a substantially constant recording start position.

4. A method according to claim 3 comprising the further step of determining an amount of advance to be provided to a successor scan line as a multiple of a clock pulse period corresponding to a selected distance.

5. Apparatus for correcting distortion of a scan line image comprising means for recording successive scan lines forming an image in combination with advancing means for recording said successive scan lines at successive advanced start positions, thereby to maintain an orthogonal relationship between images of orthogonal objects.

6. Apparatus according to claim 5 wherein said advancing means comprises:
means for determining a number of consecutive scan lines having a substantially constant recording start position between ones of said successive scan lines recorded at said substantially constant and at one of said advanced recording start positions.

7. Apparatus according to claim 6 further comprising:
means for determining an incremental advance between said ones of said successive scan lines; and
means for determining an advance recording start position between said ones of said successive scan lines as an integer multiple of said incremental advance.

8. In a scan line imaging system, the improvement comprising distortion correcting means, including
first means for staggering starting locations for various scan lines impinging on a recording medium and
secnd means connected to control said first means to cause successive scan lines to start at locations successively displaced along a main scan direction from a reference location.

9. An improved scan line imaging system as recited in claim 8 wherein said first means comprises recording head means and said second means comprises counting means responsive to clock signals for outputting recording start pulses for successive scan lines at times successively displaced from one another and from a reference clock signal.

10. An improved scan line imaging system as recited in claim 9 wherein said second means further comprises:
first clock means responsive to a reference index associated with the recording medium for producing a sequence of reference clock signals representative of said reference location, and
second clock generating means for generating a plurality of clock pulses between consecutive reference clock signals, and
wherein said counting means comprises:
means responsive to said reference clock signals and to said clock pulses to generate said recording start pulses at time displacements from said reference clock signals determined by various counts of said clock pulses.

11. An improved scan line imaging system as recited in claim 10 wherein said counting means further includes preset means for presetting a predetermined count value thereto and for setting the displacements of said scan lines from the reference clock signal as multiples of said predetermined count of clock pulses.

12. An improved scan line imaging system as recited in claim 10 wherein said counting means further includes preset means for presetting a predetermined count value thereto and for providing said successive displacements to successive sets of said predetermined count of scan lines.

13. A method according to claim 2 wherein said step of determining a distance comprises the further step of decreasing said distance between said one and said other of said intersections by a predetermined quantity for each shift of a recording head providing said recording beam by a predetermined amount in a perpendicular direction to the main scanning direction.

14. A method according to claim 1 comprising the further step of sequentially displacing said recording beam for sequentially recording said successive scan lines from said advanced start positions.

15. An apparatus for correcting scan line imaging distortion as recited in claim 5 wherein said means for recording comprises means for sequentially displacing a recording beam for sequentially recording said successive scan lines from said successively advanced start positions.

16. An improved scan line imaging system as recited in claim 8 further comprising means for sequentially displacing a recording beam for sequentially recording said successive scan lines from said successively displaced locations.

17. An improved scan line imaging system as recited in claim 9 wherein said recording head means comprises means for sequentially displacing a recording beam for sequentially recording said successive scan lines from said successively displaced locations.

* * * * *